United States Patent
Thiagarajan et al.

(10) Patent No.: US 11,588,528 B2
(45) Date of Patent: Feb. 21, 2023

(54) OPTIMAL HYBRID BEAMFORMER IN A MULTI ANTENNA WIRELESS SYSTEMS

(71) Applicant: MMRFIC Technology Pvt. Ltd., Bangalore (IN)

(72) Inventors: Ganesan Thiagarajan, Bengaluru (IN); Sanjeev Gurugopinath, Bengaluru (IN)

(*) Notice: Subject to any disclaimer, the term of this patent is extended or adjusted under 35 U.S.C. 154(b) by 0 days.

(21) Appl. No.: 17/543,754

(22) Filed: Dec. 7, 2021

(65) Prior Publication Data
US 2022/0182117 A1 Jun. 9, 2022

(51) Int. Cl.
*H04B 7/06* (2006.01)
(52) U.S. Cl.
CPC ......... *H04B 7/0617* (2013.01); *H04B 7/0634* (2013.01); *H04B 7/0686* (2013.01)
(58) Field of Classification Search
CPC ... H04B 7/0617; H04B 7/0634; H04B 7/0689
USPC ....................................................... 375/267
See application file for complete search history.

(56) References Cited

U.S. PATENT DOCUMENTS 10,707,974 B1 * 7/2020 Ho .................... H04W 72/0433

OTHER PUBLICATIONS

Chen et al. VLSI Design of a High Throughput Hybrid Precoding Processor for Wireless MIMO Systems, IEEE Access, vol. 7, publication Jun. 17, 2019, pp. 85925-85935 (Year: 2019).*

* cited by examiner

*Primary Examiner* — Leila Malek

(57) ABSTRACT

A radio frequency receiver comprises a set of antennas for receiving an RF signal over a communication channel represented by a channel matrix $H_d$, a plurality of analog beamformer for generating plurality of analog beams, wherein each analog beam former is coupled to a subset of antennas comprising a fewer number antennas in the set of antennas, a mixer for combining the plurality of analog beams to provide a down converted signal, and a digital beam former for generating a plurality of digital beams, wherein a set of analog weights ($F_R$) of the plurality of analog beamformer and a set of digital weights ($F_B$) of the digital beamformer are selected such that effective beam formed by their product $F_B F_R$ is orthogonal and spans the same space as columns of the channel matrix $H_d$.

7 Claims, 6 Drawing Sheets

OPTIMAL HYBRID BEAMFORMER IN A MULTI ANTENNA WIRELESS SYSTEMS

BACKGROUND

Cross References to Related Applications

This application claims priority from Indian patent application number 202041027871 filed on Dec. 8, 2020 which is incorporated herein in its entirety by reference.

TECHNICAL FIELD

Embodiments of the present disclosure relate to wireless transceivers and more particularly relate to method, system and apparatus for optimal hybrid beamforming in a multiple antenna wireless system.

RELATED ART

Wireless transceivers often employ RF antennas for radiating and collecting the RF signal (electromagnetic waves) for transmitting and receiving wireless signals. For example, wireless communication system such as 3G/4G/5G systems, RADAR systems and object detection systems employ RF antennas to transmit and receive RF signals. The antenna radiates the RF signal energy in all directions. Thus, the energy transmitted in any desired direction is lesser than the total energy/strength radiated by the antenna. In order to enhance the transmitted RF signal strength (gain) in a particular direction, beam forming techniques are employed. In the beam forming technique multiple phase shifted version of the RF signal are transmitted or received on a plurality of antennas (antenna array) as is well known in the art. The conventional beam forming technique is further described in the literature titled Multibeam Antenna Technologies for 5G Wireless Communications by Wei Hong, et al, published in IEEE transactions on antennas and propagation, vol. 65, no. 12, December 2017, which is incorporated herein by reference. Briefly, beam forming (generating multiple phase shifted signals) is performed in analog mode, digital mode and hybrid mode.

FIG. 1A illustrates an example conventional analog beamforming. As shown there, the antennas 110A-N receives the RF signals, the phase shifters 120A-N shift the phase of the corresponding received RF signals, the combiner 130 combines the phases sifted RF signals. The multiplier 140 and local oscillator (LO) 145, converts the RF signal received from the combiner to base band signal for further processing. The combined RF signal provided by combiner 130 is represented by relation:

$$Y = \Sigma_{i=0}^{n} W_i X_i, \qquad (1)$$

In that, Xi represents signals received from antennas, $W_i$ represents the weights (phases shift and gain) provided to the corresponding ones of $X_i$ signals. Accordingly, as the number of antennas are increased to reduce the beam width, the $W_i$ requires to be in smaller phase values (at least when beams are required to be steered in smaller angle or good angular resolution). The analog conventional beam forming places limitation (at least in terms of the analog hardware part) on the smaller phase values in $W_i$.

FIG. 1B illustrates an example conventional digital beam forming. As shown there, the antennas 110A-N receives the RF signals, the mixers 150A-N mixes the RF signals on corresponding channels 116A-N with a reference signal from LO 160 to convert each RF signal to respective baseband signals 157A-N. Digital Beam former 170 performs beam forming to provide baseband beams on paths 171 and 172. The beamformer output Y may be represented using relation:

$$Y = WX, \qquad (2)$$

in that, W represents a weight matrix and X represents the input baseband signal vector.

As is well known in the art, the conventional digital beam former 170 may perform digitization of the RF signal and may perform matrix multiplication with the weight matrix. Due to digital processing with large bit width multipliers, a smaller beam width (high resolution) may be obtained. In other words, a smaller phase shifts may be achieved in the digital processing, thereby accommodating any desired beam direction and resolution. However, the digital beam former increases the complexity of the hardware as the number of base band converter (base band processing channels) increase with increasing number of receiving/transmitting antennas.

FIG. 1C illustrates an example conventional hybrid beam forming. As shown there, the antennas 110A-N receives the RF signals, the analog beam former 180 generates set of beams 181A-D, the Base band processing channel 185A-D converts the RF beam 181A-181D to corresponding baseband beam 186A-D, digital beam former 190 performs digital beam forming on the base band signals 186A-D to generate digitized beams 191A-C.

As is well known in the art, the number of base band converting channels is reduced due to first level of analog beam forming (180) and the benefits of smaller phase angles (high resolution) are obtained by employing the digital beam former (190). The conventional hybrid beam former reduces the hardware complexity by reducing the number of baseband processing channels. However, such reduction in the hardware causes the reduced flexibility at the digital beam former.

US Patent US10, 979, 117 (Granted to the current applicant of this patent application) overcomes some of the disadvantages of the above mentioned prior at. However, the technology as taught in U.S. Pat. No. 10,979,117 is not optimal when the antennas are sparsely connected to analog beamforming channels.

SUMMARY

According to an aspect, a radio frequency receiver comprises a set of antennas for receiving an RF signal over a communication channel represented by a channel matrix $H_d$, a plurality of analog beamformer for generating plurality of analog beams, wherein each analog beam former is coupled to a subset of antennas comprising a fewer number antennas in the set of antennas, a mixer for combining the plurality of analog beams to provide a down converted signal, and a digital beam former for generating a plurality of digital beams, wherein a set of analog weights ($F_R$) of the plurality of analog beamformer and a set of digital weights ($F_B$) of the digital beamformer are selected such that effective beam formed by their product $F_B F_R$ is orthogonal and spans the same space as columns of the channel matrix $H_d$.

According to another aspect, the digital beam former providing a signal $y_b = F_B F_R H_d P s + F_B F_R n$, in that s representing the signal transmitted into the channel $H_d$, P representing the precoder matrix at a transmitter transmitting the signal s and n representing a receiver noise.

According to yet another aspect, the plurality of antennas are arranged over set of patches on the radio frequency receiver wherein, the set of patches are physically at different positions, the subset of antennas are derived from one or more patches in the set of patches.

According to yet another aspect, a method in a radio frequency communication system comprising a set of analog beam former and a digital beam former comprises constructing a first matrix order T X M where in M representing a number of analog beamformer in the set of analog beamformer and T representing number of antenna, wherein the first matrix is sparse with non zero values according to the number antennas coupled to correspond analog beamformer and rest being zero values, determining a first set of weights corresponding to the non zero elements in the first matrix by minimizing an angle between the vector spaces spanned by an ideal set of weights and an another set of weights, wherein the ideal set of weights being ideal values and the another set of weights comprising all possible sparse orthogonal weights as allowed by the sparse antenna coupling and determining a weight matrix as a transformation matrix between a basis vectors of the two vector spaces and adapting the weight matrix for implementing the digital beamformer.

According to yet another aspect, a radio frequency transmitter comprises a set of antennas for transmitting an RF signal over a communication channel, a plurality of analog beamformer for generating plurality of analog beams, wherein each analog beam former is coupled to a subset of antennas comprising a fewer number antennas in the set of antennas, a digital beam former for generating a plurality of digital beams, and a mixer for combining the plurality of digital beams to provide a upconverted signal, wherein a set of analog weights of the plurality of analog beamformer and a set of digital weights of the digital beamformer maintain a relation: $W_R W_B \approx V$, in that $W_B$ representing weights of the digital beamformer, the $W_R$ representing weights of the analog beamformer and V representing a right singular vectors of the communication channel matrix $H_d$.

DETAILED DESCRIPTION OF THE PREFERRED EXAMPLES

Figure 1A:
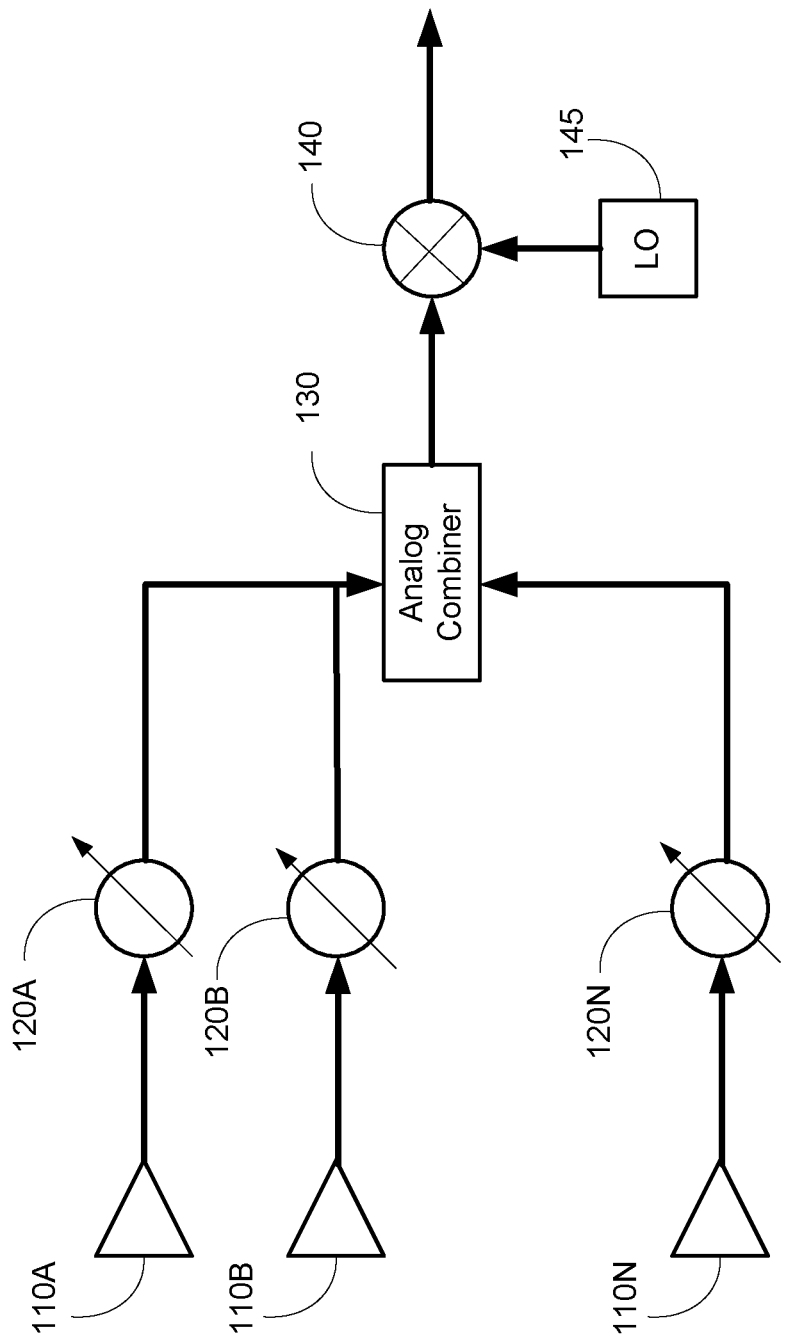
FIG. 1A illustrates an example conventional analog beam forming.
Figure 1B:
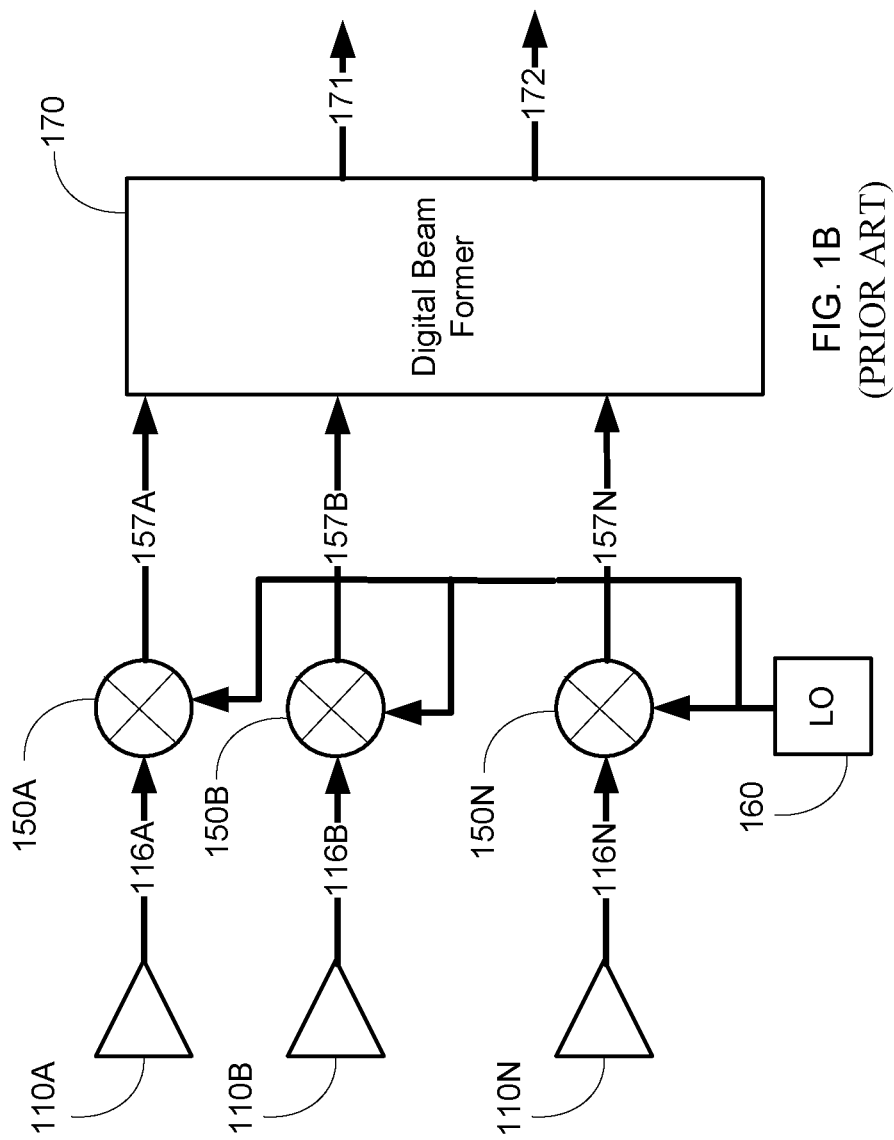
FIG. 1B illustrates an example conventional digital beam forming.
Figure 1C:
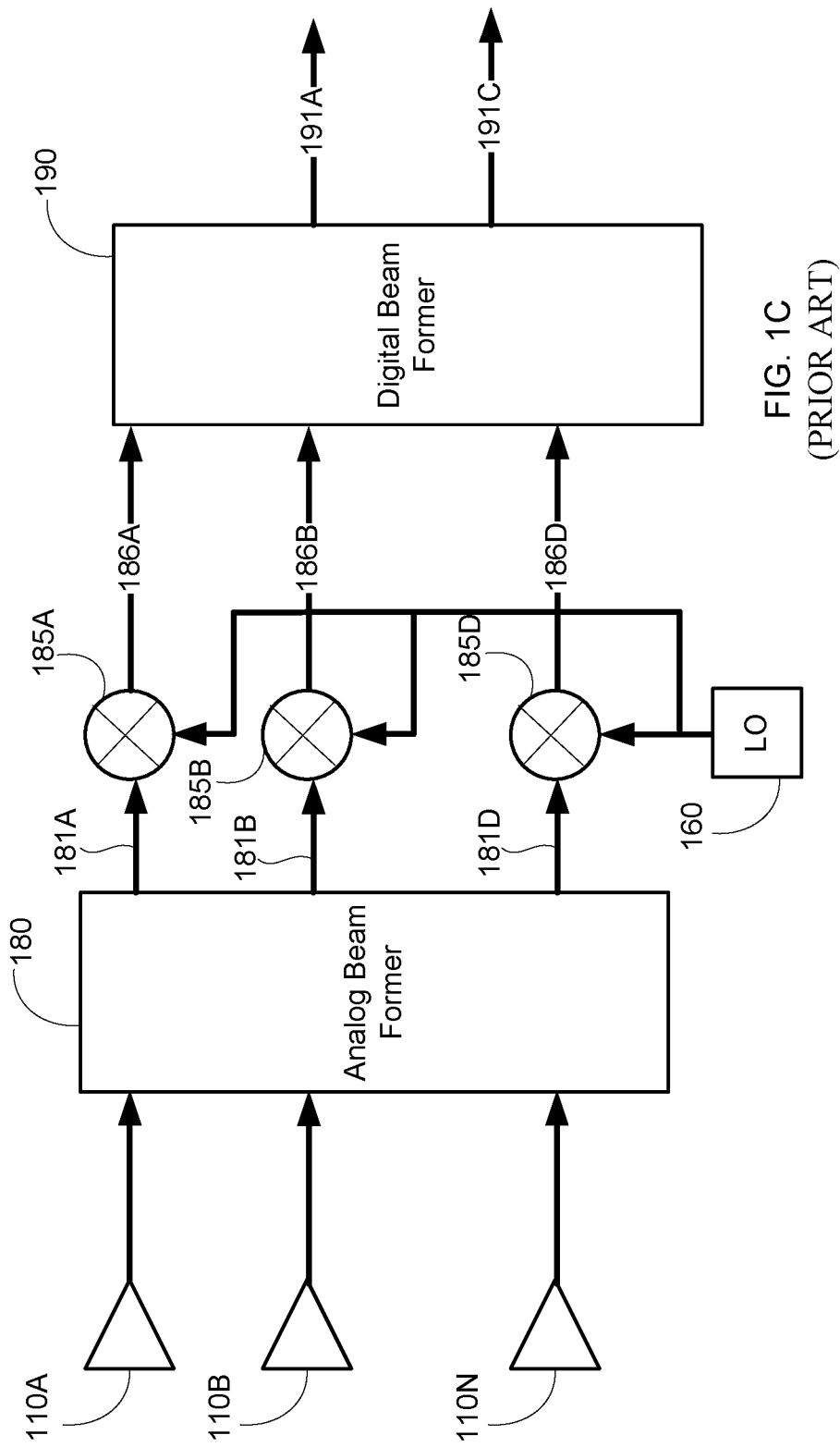
FIG. 1C illustrates an example conventional hybrid beam forming.
Figure 2A:
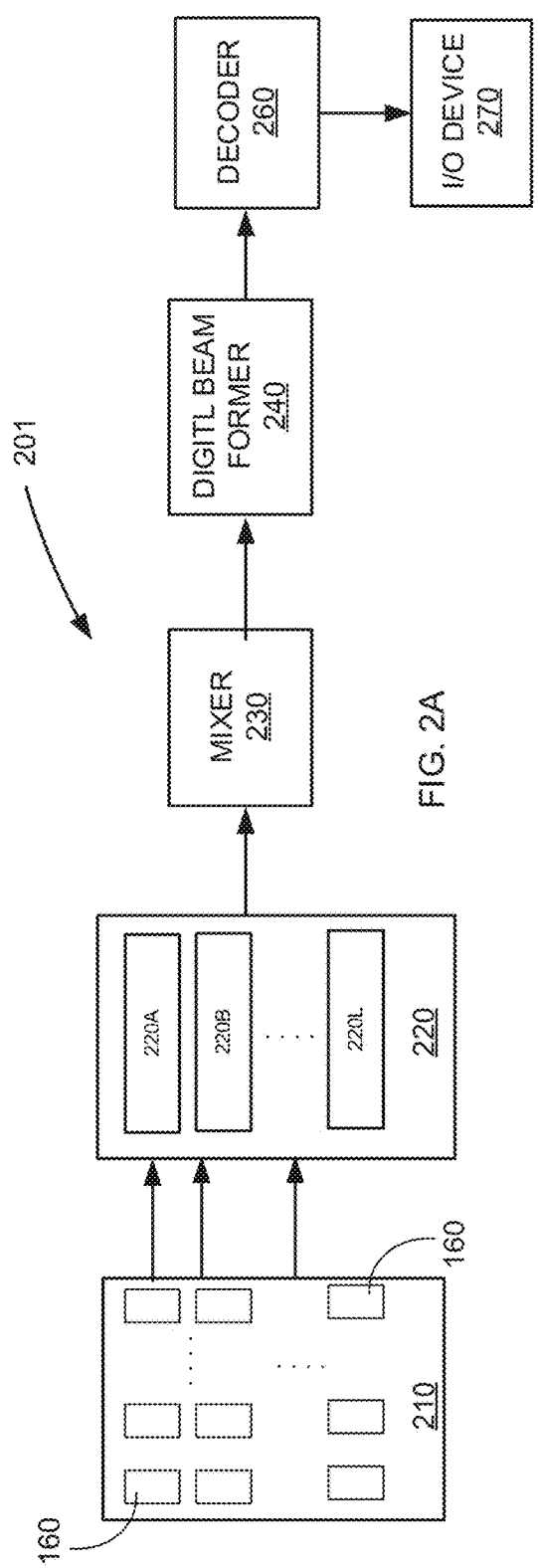
FIG. 2A is an example RF receiver system in an embodiment.

FIG. 2A is an example RF receiver system in an embodiment. The receiver 201 is shown comprising antenna array 210, analog beamformers 220, Mixer 230, Digital Beam former 240, decoder 260 and input/output (I/O) devices 270. Each block is further described below.

Figure 2B:
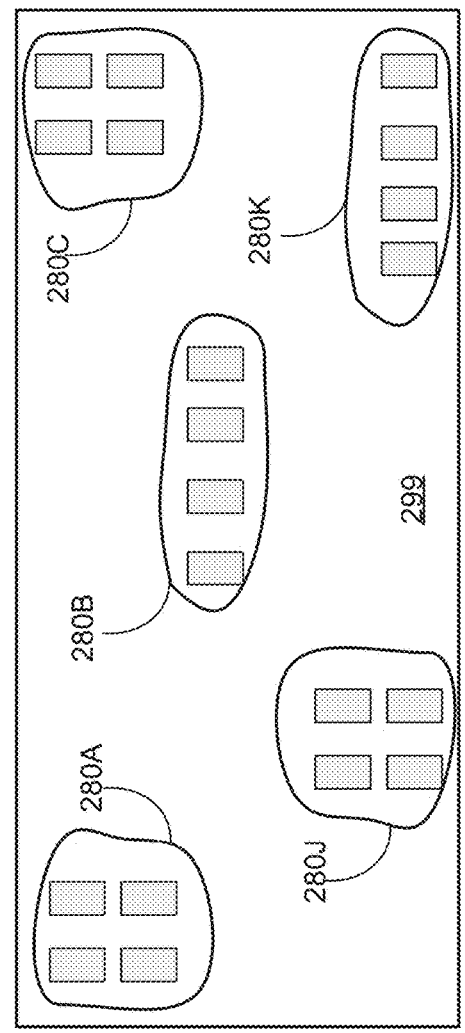
FIG. 2B illustrates an example device 299 in which the antenna elements are distributively/sparsely located instead of a regular (geometrical) array.

The antenna array 210 is shown comprising antennas (antenna elements) 210A-210N. The antenna array 210 is employed to determine the angle of arrival (beamforming as is well known). The antenna array 210 is configured for a MIMO (Multiple Input and Multiple Output) operation. In one embodiment the antenna elements 210A-210N are distributively located on a device. FIG. 2B illustrates an example device 299 in which the antenna elements are distributively/sparsely located instead of a regular (geometrical) array. As shown there, the antenna elements are formed on edges and at centre (for illustration) in patches 280A-280K. Each patch 280A-280K houses a finite number of antenna elements that may not be equal in number. The device 299 may be a mobile device operative on 5G protocol or 5G communication links. Such sparse arrangement of antenna may be required on a device to optimise on the space, at least.

The analog beamformers 220 receives the signal from the antenna array 210 and perform analog beam forming. The analog beamformers 220 is shown comprising plurality of analog beam formers 220A-220L. Each analog beam former 220A-220L may receive a signal from selected set of antennas. For example, the beamformer 220A may receive signal from antenna 210A-C (for example, not shown), the beamformer 220B may receive signal from antenna 210D-210G, the beamformer 220C may receive signal from antenna 210A, 210D, 210F-210H, etc. Each beamformer 220A-220L may receive the signal from the antennas located in different patches 280A-280K, or from a same patch, etc. Since only a few antenna elements are coupled to each analog beamformer, the weight matrix representing the analog beamforming by the analog beam former 220A-220L may be sparse and is of the form:

$$\begin{bmatrix} X1 & 0 & X3 & 0 & \ldots .0 & 0 \\ 0 & X2 & 0 & X3 & \ldots .0 & 0 \\ 0 & 0 & 0 & 0 & \ldots .X4 & X5 \end{bmatrix}$$

in that, each row representing the analog beamformer in the plurality of beam former with X's representing the antennas coupled to the corresponding analog beam former and 0's representing the unconnected antennas to the respective beamformer in the respective position of an array X1-XT (210A-210N).

Each analog beamformer 220A-220L provides the Beams to the mixer 230. The Mixer 230 mixes the received RF beams from the analog beamformers 220A-220L with a reference signal to generate a corresponding number of beams in the intermediate frequency band (referred to as IF Beams). The Mixer 230 may also combine the signal and provide the combined signal as a baseband (BB) signal to the digital beamformer 240. The number of IF/BB beams corresponds to number of beamformers. The IF/BB beams are provided to Digital Beam former 240.

The Digital Beamformer 240 performs digital beamforming on the received IF beams. In one embodiment, the digital beamformer 240 is operative to generate M number of base band beams. The Digital beam former may be implemented to provide a desired beam resolution. The beam formed at the output of the digital beam former is dependent on the values in the analog beamformers 220 and digital beam former 240. In one embodiment, the based band signal formed at the output of the digital beamformer may be represented as:

$$y_b = F_B F_R H_d P \ s + F_B F_R n \text{(also referred to as signal model)}. \tag{1}$$

Wherein, $y_b$ representing the based band signal at the output of the digital beamformer 240, $F_B$ representing the weight matrix of the digital beam former 240, $F_R$ representing the weight matrix of the analog beam former 220, $H_d$ representing the downlink channel matrix (transfer function), s representing the signal (data/information) intended for transmitting at a transmitter, P representing the precoder matrix at the transmitter, P s=S representing signal transmitted into the channel $H_d$, and n representing the receiver noise. In one embodiment, the values (weights) $F_B$ and $F_R$ is set such that the product $F_B \ F_R$=U, wherein the U is left singular vectors (also referred to as matrix) of $H_d$.

Decoder 260 decodes the data and information from the output of the digital beam former 240. Due to the weight selected in the analog beamformer 220 and the digital beamformer 240, the signal to noise ratio is increased and/or the interference between the spatial channels are minimised even when the antennas are sparsely connected to the analog beamformer. The decoded information is provided to the I/O device 270 for performing several control operations and/or further processing. The I/O devices 270 may comprise one or more of memory device, communication modem, data ports, etc.

Figure 3:
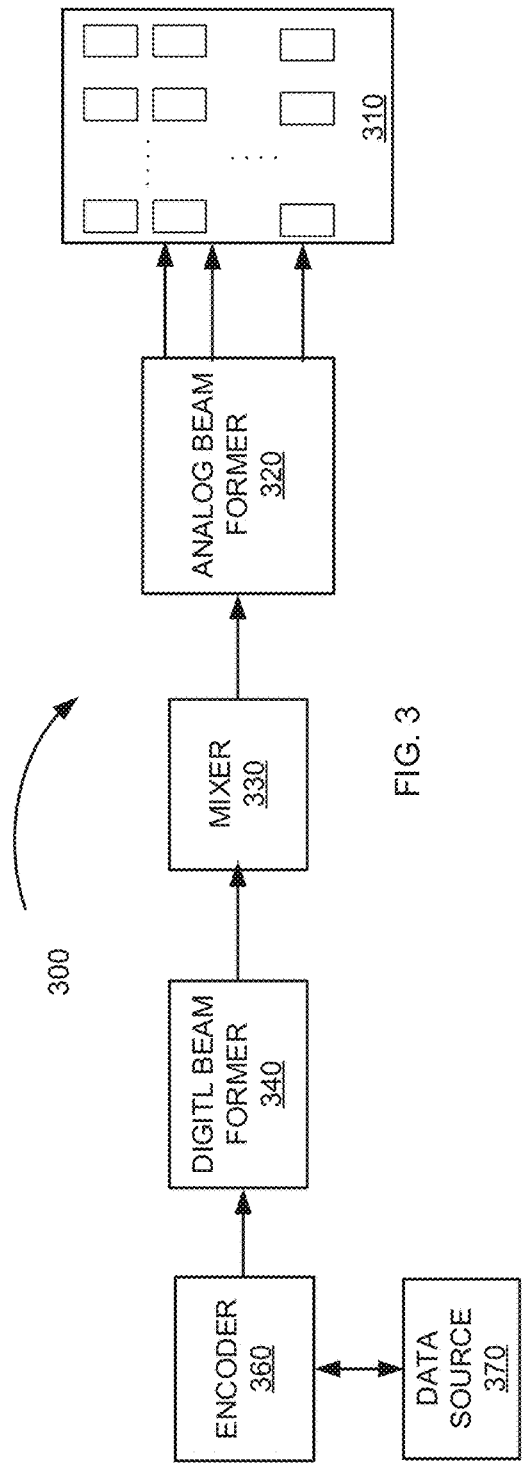
FIG. 3 is a block diagram illustrating a transmitter in an embodiment.

In conjunction, a transmitter may transmit the signal s forming a beam through analog and digital beamformer. FIG. 3 is a block diagram illustrating a transmitter in an embodiment. The transmitter 300 is shown comprising an antenna array 310, analog beamformers 320, Mixer 330, Digital Beam former 340, Encoder 360 and data source 370. In that, the analog beamformers 320 are selectively coupled to the antennas to form sparse matrix. The digital beam former operate in base band or in the IF band to generate plurality of digital beam from the base band signal generated by the encoder. The encoder 360 generates the digital signal representing the data from the data source 370. In other words, the transmitter 300 (elements) operate conjunctively to the receiver 200. Accordingly, in one embodiment the signal s transmitted on the channel may be represented as:

$$S = W_R W_B \ s \tag{2}$$

In that, $W_B$ representing the weight matrix of the digital beam former 340, $W_R$ is representing the weight matrix of the analog beam former 320, s representing the encoded baseband signal. In one embodiment, the values (weights) $W_B$ and $W_R$ is set such that the product $W_R \ W_B$=V, wherein the V is right singular matrix of $H_d$. While description is provided with the downlink channel for illustration, the technology may be adopted to uplink channel (with the corresponding up link channel matrix $H_u$) by maintaining the order and rank of the weight matrixes.

Figure 4:
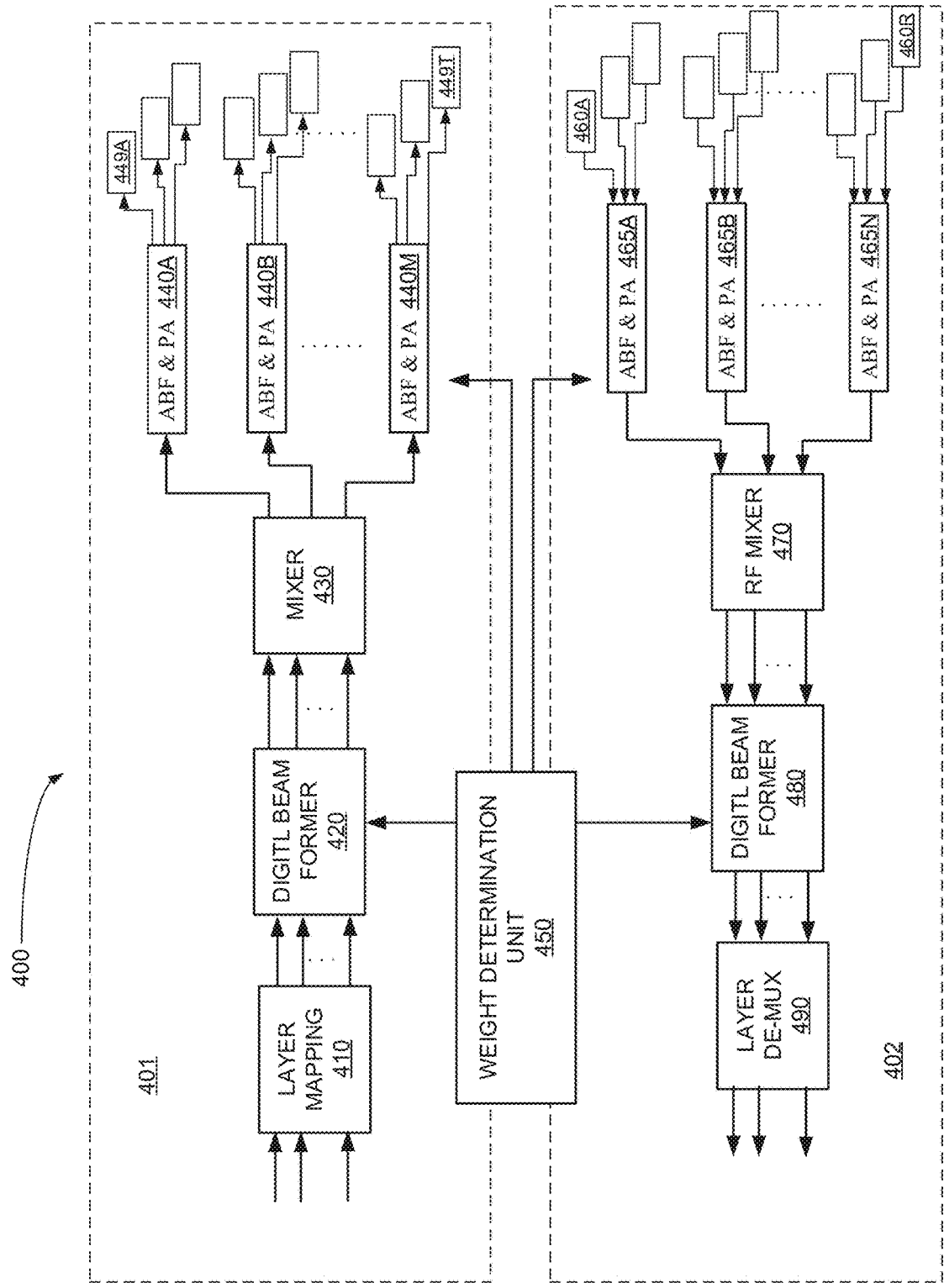
FIG. 4 is a block diagram illustrating a communication system 400 comprising both transmitter 401 and receiver 402.

FIG. 4 is a block diagram illustrating a communication system 400 comprising both transmitter 401 and receiver 402. In that, the transmitter 401 and receiver 402 may be one of a base station (BS) and user equipment (UE). The base station may be one of the 4G and 5G network base station and UE may be a mobile phone connecting to base station. In an embodiment, both UE and base station may house both transmitter 401 and receiver 402 as transceiver for both transmission and reception of 4G/5G or any other such communication signal.

The transmitter 401 is shown comprising layer mapping unit 410, Digital beamformer (DBF) 420, RF Mixer 430 analog beamformer and Power Amplifier (ABF & PA) 440A-440M, transmit antenna 449A-T. Similarly the receiver 402 is shown comprising receiving antennas 460A-R, analog beamformer and Power Amplifier (ABF & PA) 465A-465N, RF mixer 470, digital beam former (DBF) 480, layer de-multiplexer 490. In that the weight determination unit 450 is shown coupled to the DBF 420 and 480, ABF &PA 440A-440M and 460A-440N.

In the transmitter, the layer mapping unit 410 perform layer mapping of user code words (multiple user data) to the number of analog beamformers (ABF) as is well known in the field of 4G/5G communication system. For example, when the antenna array 449A-449T and 460A-T are operated as MIMO system providing spatial multiplexing capabilities, the layer mapping unit 410 maps the code words to the desired number of layers that are spatially multiplexed using the transmit and receive antenna array. Digital beamformer (DBF) 420 is shown providing M beams to the RF mixer 430. The DBF 430 may be implemented similar to digital beam former 340. The RF Mixer 430 receives the M digital beams from the DBF 420 and performs up-conversion to generate corresponding M number of RF beams. The RF beams are provided to the corresponding ABF &PA 440A-440M. The ABF &PA 440A-440M spreads the M beams to T antennas 449A-449T. As shown there each analog beam former is coupled to fewer numbers of antennas (Fewer than T). Thus, forming a sparsely connected antenna network. The ABF &PA 440A-440M may be coupled to antennas sparsely as described with reference to FIG. 3.

Similarly, the receiver section 402 operates in conjunction with the transmitter 402. As shown there, the R number of antennas 460A-R receives the signal through the channel (4G/5G). The antennas 460A-R are sparsely coupled to the ABF & PA 465A-465N. That is only a fewer number of antennas are coupled to each ABF & PA 465A-465N. As shown, the ABF & PA 465A-465N provides N channels to the RF mixer 470 to combine and down covert the N channels of RF analog beamformer signals. The combined and down converted N channel signal is provided to the DBF 480 for digital beam forming. The digital beamformer 480 may be implemented similar to the DBF 240. The layer de-multiplexer 490 operates to de-multiplex the code words from L number of layers to form user data streams.

In the above MIMO communication system 400 with T transmit antennas at the transmitter and R receive antennas at the receiver, the transmit antennas are fed by analog beamformers which spread the M channel input to the T antennas. The M channels of the analog beamformers are fed by L spatial layers of user signal through a digital beamformer. As an example, if T=64, M=8, and 4≤L≤M, each analog beamformer is connected to at most 8 antennas in a non-overlapping manner. Similarly, the receiver uses N channels output after the analog beamformer, K spatial channels after the digital beamformer. For instance, say R=16, N=4 and 2≤K≤N. The channel (not shown) is assumed to be quasi-stationary with individual elements of the channel matrix H drawn from random variables for every coherence period (for example, circularly symmetric, complex Gaussian (CSCG) random variables with zero mean and unit variance).

Each beam former DBF 420 and 480 and ABF & PA 440A-440M and 465A-465N comprises phase shifters and gain unit (as is well known and also as illustrated in the U.S. Pat. No. 10,979,117). The phase angle and the gain (amplitude) value of the phase shifter and the gain unit together referred to as the weights. The weight computation unit 490 determines and sets the weights of the beamformers DBF 420 and 480 and ABF & PA 440A-440M and 465A-465N.

Figure 5:
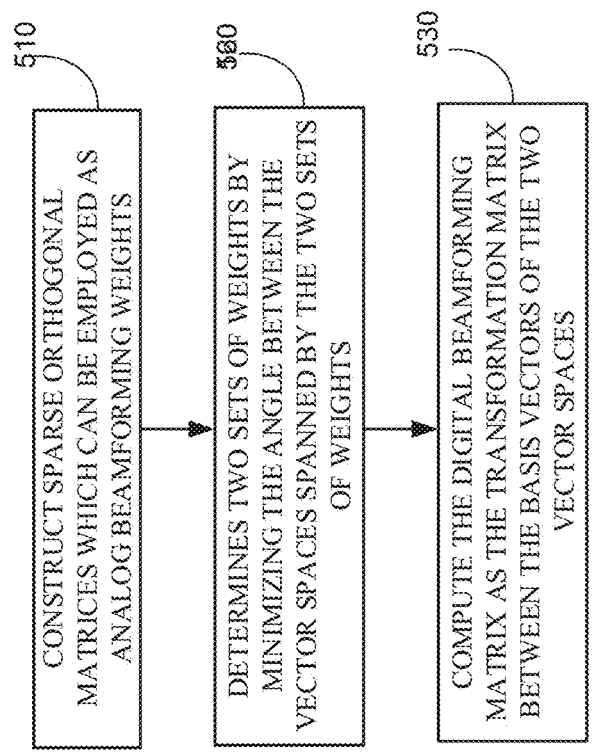
FIG. 5 illustrates the weight computation in one embodiment.

FIG. 5 illustrates the weight computation in one embodiment. In block 510, the weight computation unit 490 construct sparse orthogonal matrices which can be employed as Analog beamforming weights of ABF & PA 440A-440M and/or 465A-465N. In block 520, the weight computation unit 490 determines the optimal sparse orthogonal weights from the two set of weights (one being ideal desired and other being a set of all possible sparse orthogonal weights as allowed by the sparse antenna geometry chosen by the antenna design) by minimizing the angle between the vector spaces spanned by the two sets of weights. In block 530, the weight computation unit 490 compute the digital beamforming matrix as the transformation matrix between the basis vectors of the two vector spaces (corresponding to the ideal desired singular vectors matrix and best possible sparse orthogonal weights). Further describing with reference to FIGS. 4 and 5, the weight computation unit 490 may determine the transmit beamforming as below.

Considering number of transmit antennas is T, and the transmit antennas are split across M RF-BB chains with D=T/M antennas per chain. That is, the analog beamformer associated with each RF-BB chain has D number of antenna elements. Thus in the equation (2), H has dimensions R×T, the analog beamformer $W_R$ has dimensions T×M, the digital beamformer $W_B$ has dimensions M×L, the user signal vector s has dimensions L×1 and the receiver noise vector n has dimensions R×1. Wherein, L representing the number of layers used in the communication. It may be appreciated that, the analog beamformer Matrix $W_R$ is sparse, as only D antennas are attached to every RF chain. This imposes certain structure in $W_R$, apart from the restrictions in the precision available for the phase shift and amplitude control. That is, the analog weights can be selected, only from a finite set of allowable phase shifts and amplitude scales. In one embodiment, as the M strongest right singular vectors of the channel matrix $H_d$ form the optimal transmit beamforming (preceding) matrix, P, the weight computation unit 490 selects P=$W_B$ $W_B$=$V_{1:L}$, wherein $V_{1:L}$ denotes the dominant L right singular vectors of $H_d$.

In that, the structure of $W_R$ is obtained based on the hardware constraints such as the number of antennas per RF-BB chain, precision available for the phase, amplitude control and the total transmit power per transmission, per RF-BB chain. Based on these constraints, the sparse orthogonal matrices may be constructed using the well known complex orthogonal design (COD) for space time block codes (STBC) techniques. Thus, by selecting the COD (which meets the dimensions required for each Analog beam former) as base code matrix, the sparse orthogonal matrices may be constructed meeting the constraints, which can be used as the analog beamforming matrix, $W_R$. In one embodiment, the number of columns in COD is chosen such that, the analog beamformer output forms sufficient statistics represented by: $y_{bs}=W^H_{bs}(X+N)$. Wherein, where X denotes the array signal matrix with dimensions $N_{ant}$ X K, the beam space weight matrix $W_{bs}$ has dimensions $N_{bs}$ X $N_{ant}$, K denotes the number of snapshots of array data and N is the observation noise and $N_{ant}$ is the number of antennas connected to one analog beamformer.

To approximate the right singular vectors to maximize the achieved rate, the following sub-space approximation may be utilized. In other words, $W_R$ and $W_B$ must meet the requirement $W_R W_B \approx V_{1:L}$. This approximation required to be valid among all possible matrices of $W_R$ and $W_B$ such that capacity is maximized. That is, the best analog beamformers may be selected by solving the linear programming relation:

$$W^*_R = \arg\max \|W^H_R V_{1:L}\|_2 \quad (3)$$

Similarly, Digital beamformer weights $W_B$ may be selected after determining the weights of the analog beamformer using the relation $W_B=W^H_R V$, since it is desirable to approximate V as the product of $W_R$ and $W_B$.

While determining the $W_R$ and $W_B$ for transmitter, the receiver weights are presumed to be ideal and vice a versa. However, when both transmitter and receivers are incorporated in a single chip, the $W_R$ and $W_B$ for both transmitter part and the receiver part (say 401 and 402) may be determined by combining the process described with reference to receiver and transmitter above in the following manner. At first, the channel matrix is made available at both the transmitter and receiver separately and both of them independently compute their optimal transmitter beamformer matrices and receiver beamformer matrices.

In the next step, The transmitter (base station) transmits approximately orthogonal beam weights $W_{R,F} W_{B,F} \approx F_{1:M}$, wherein $W_{B,F}$ is taken as $I_{M \times M}$ and $F_{1:M}$ denotes M columns of any orthogonal matrix such as normalized Fourier matrix. To ensure that the M columns chosen from $F_{1:T}$ span the same space where UE is present, all T dimensions are scanned ahead of this data transmission, i.e., at the initial beam acquisition time such as PBCH decoding, to ensure that transmitter identifies the tight set of M columns. UE also uses N columns of a similar orthogonal beam weights matrix corresponding to normalized Fourier matrix $F_{B,F} F_{R,F} \approx F_{1:N}$, wherein $F_{B,F}=I_{N \times N}$.

In the next step, the receiver (490) estimates the channel matrix $H_d$, computes the optimal beamforming matrices $F_B$, $F_R$ for the chosen number of layers K, and uses them as uplink transmit beamforming matrices. Due to determination of the weights as described above practical constraints on the hybrid and analog beamformer architectures may be effectively overcome without iteration of design and with computational deterministic.

While various embodiments of the present disclosure have been described above, it should be understood that they have been presented by way of example only, and not limitation. Thus, the breadth and scope of the present disclosure should not be limited by any of the above-discussed embodiments but should be defined only in accordance with the following claims and their equivalents.

What is claimed is:

1. A radio frequency receiver comprising:
a set of antennas for receiving an radio frequency (RF) signal over a communication channel represented by a channel matrix $H_d$;
a plurality of analog beamformers for generating plurality of analog beams, wherein each analog beamformer is coupled to a subset of antennas comprising a fewer number antennas in the set of antennas;
a mixer for combining the plurality of analog beams to provide a down converted signal; and
a digital beamformer for generating a plurality of digital beams,
wherein a set of analog weights ($F_R$) of the plurality of analog beamformers and a set of digital weights ($F_B$) of the digital beamformer are selected such that effective beam formed by their product $F_B F_R$ is orthogonal and spans the same space as columns of the channel matrix $H_d$, in that $F_R$ is a sparse matrix of the form:

$$F_R = \begin{bmatrix} X1 & 0 & X3 & 0 & \ldots & 0 & 0 \\ 0 & X2 & 0 & X3 & \ldots & 0 & 0 \\ 0 & 0 & 0 & 0 & \cdots & X4 & X5 \end{bmatrix}$$

in that, each row representing an analog beamformer in the plurality of analog beamformers with X representing the connected antennas coupled and 0's representing the unconnected antennas to the respective analog beamformer in the respective position of an array $X_1$-$X_T$, and $F_B F_R \approx U$, wherein U representing a left singular vectors of the communication channel matrix $H_d$.

2. The radio frequency receiver of claim 1, wherein the digital beamformer providing a signal $y_b = F_B F_R H_d P s + F_B F_R n$, in that s representing the signal transmitted into the channel $H_d$, P representing the precoder matrix at a transmitter transmitting the signal s and n representing a receiver noise.

3. The radio frequency receiver of claim 1, wherein the set of antennas are arranged over set of patches on the radio frequency receiver wherein, the set of patches are physically at different positions, the connected antennas are derived from one or more patches in the set of patches.

4. A method in a radio frequency communication system comprising a set of analog beamformers and a digital beamformer comprising:
   constructing a first matrix order R X M wherein M representing a number of analog beamformers in the set of analog beamformers and R representing number of receive antennas, both R and M being non-zero positive integer, wherein the first matrix is sparse with non-zero values according to the number of antennas coupled to a corresponding analog beamformer and the rest being zero values;
   determining a first set of weights corresponding to the non-zero values in the first matrix by minimizing an angle between two vector spaces spanned by an ideal set of weights and another set of weights, wherein the ideal set of weights being ideal values and the another set of weights comprising all possible sparse orthogonal weights as allowed by sparse antenna coupling; and
   determining a weight matrix as a transformation matrix between a basis vectors of the two vector spaces and adapting the weight matrix for implementing the digital beamformer.

5. A radio frequency transmitter comprising:
   a set of antennas for transmitting a radio frequency (RF) signal over a communication channel;
   a plurality of analog beamformers for generating plurality of analog beams, wherein each analog beamformer is coupled to a subset of antennas comprising a fewer number antennas in the set of antennas;
   a digital beamformer for generating a plurality of digital beams; and
   a mixer for combining the plurality of digital beams to provide a up converted signal;
   wherein a set of analog weights of the plurality of analog beamformers and a set of digital weights of the digital beamformer maintain a relation:
   $W_R W_B \approx V$, in that $W_B$ representing weights of the digital beamformer, the $W_R$ representing weights of the analog beamformers and V representing a right singular vectors of the communication channel matrix $H_d$, wherein $W_R$ is a sparse matrix of the form:

$$W_R = \begin{bmatrix} X1 & 0 & X3 & 0 & \ldots .0 & 0 \\ 0 & X2 & 0 & X3 & \ldots .0 & 0 \\ 0 & 0 & 0 & 0 & \ldots .X4 & X5 \end{bmatrix}$$

in that, each row representing an analog beamformer in the plurality of analog beamformers with X representing a first subset of antennas coupled to a corresponding analog beamformer and 0's representing the unconnected antennas to the respective analog beamformer in the respective position of an array X1-XT.

6. The radio frequency transmitter of claim 5, wherein the plurality of analog beamformers providing a signal $S = W_R W_B s$, in that s representing an encoded baseband signal provided to the digital beamformer.

7. The radio frequency transmitter of claim 6, wherein the set of antennas are arranged over set of patches on the radio frequency transmitter wherein, the set of patches are physically at different positions, the first subset of antennas are derived from one or more patches in the set of patches.

* * * * *